(12) United States Patent
Shigeta et al.

(10) Patent No.: US 12,272,205 B2
(45) Date of Patent: Apr. 8, 2025

(54) READING SYSTEM FOR GAME TOKENS

(71) Applicant: ANGEL GROUP CO., LTD., Shiga (JP)

(72) Inventors: Yasushi Shigeta, Shiga (JP); Satoru Monji, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 501 days.

(21) Appl. No.: 17/393,857

(22) Filed: Aug. 4, 2021

(65) Prior Publication Data
US 2022/0044517 A1 Feb. 10, 2022

(30) Foreign Application Priority Data

Aug. 7, 2020 (JP) .................. 2020-135193

(51) Int. Cl.
G07F 17/32 (2006.01)
G06K 19/07 (2006.01)
G06K 19/077 (2006.01)

(52) U.S. Cl.
CPC ....... *G07F 17/322* (2013.01); *G06K 19/0723* (2013.01); *G06K 19/07773* (2013.01)

(58) Field of Classification Search
CPC ............... G07F 17/322; G07F 17/3248; G07F 17/3293; G06K 19/0723; G06K 19/07773; G06K 7/10356
See application file for complete search history.

(56) References Cited

U.S. PATENT DOCUMENTS

| 8,668,148 | B2 | 3/2014 | Gronau et al. | |
| 10,342,157 | B2* | 7/2019 | Chang | H05K 7/20209 |
| 2009/0093293 | A1* | 4/2009 | Koyama | A63F 3/00157 463/17 |
| 2010/0105486 | A1 | 4/2010 | Shigeta | |
| 2010/0210355 | A1* | 8/2010 | Koyama | G07F 17/322 463/43 |

(Continued)

FOREIGN PATENT DOCUMENTS

| EP | 3690835 A1 | 8/2020 |
| JP | 2006231089 A | 9/2006 |

(Continued)

OTHER PUBLICATIONS

International Search Report dated Nov. 2, 2021 issued in PCT Application PCT/JP2021/029177.

*Primary Examiner* — Omkar A Deodhar
*Assistant Examiner* — Shauna-Kay Hill
(74) *Attorney, Agent, or Firm* — NORTON ROSE FULBRIGHT US LLP

(57) ABSTRACT

A reading system comprises a storage section that is provided in a game table and extending in a plane, for storing a game token equipped with an RFID tag; and a reading device having an antenna configured to generate an electromagnetic wave for reading the RFID tag of the game token stored in the storage section, wherein the reading device has a plurality of the antennas corresponding to a plurality of partial areas of the storage section so that the electromagnetic waves of the plurality of antennas do not read the RFID tag of the game token placed in a predetermined area other than the storage section where the game token is placed.

17 Claims, 14 Drawing Sheets

(56) References Cited

U.S. PATENT DOCUMENTS

| | | | |
|---|---|---|---|
| 2012/0080845 A1* | 4/2012 | Emori | A63F 1/067 273/309 |
| 2013/0168449 A1* | 7/2013 | Lee | G06K 19/07796 235/439 |
| 2013/0270342 A1 | 10/2013 | Koyama | |
| 2014/0291399 A1* | 10/2014 | Koyama | G06K 7/10336 235/439 |
| 2015/0141126 A1* | 5/2015 | Hoyt | G06K 19/0723 463/25 |
| 2016/0180633 A1* | 6/2016 | Yamaguchi | G07F 17/322 463/31 |
| 2019/0318576 A1 | 10/2019 | Shigeta | |
| 2019/0347893 A1 | 11/2019 | Shigeta | |
| 2020/0018810 A1* | 1/2020 | Seitz | G01S 13/74 |

FOREIGN PATENT DOCUMENTS

| | | |
|---|---|---|
| JP | 2012075781 A | 4/2012 |
| JP | 2013222237 A | 10/2013 |
| JP | 2014504164 A | 2/2014 |
| JP | 2014203139 A | 10/2014 |
| WO | 2008120749 A1 | 10/2008 |
| WO | 2017150883 A1 | 9/2017 |
| WO | 2018123149 A1 | 7/2018 |
| WO | 2019221063 A1 | 11/2019 |
| WO | 2020158177 A1 | 8/2020 |

* cited by examiner

READING SYSTEM FOR GAME TOKENS

CROSS-REFERENCE OF RELATED APPLICATIONS

This application claims the benefit of JP Pat. App. No. 2020-135193, filed Aug. 7, 2020, the contents of which are hereby incorporated by reference.

FIELD

The present disclosure relates to a system for reading game tokens with RFID in casinos and other gaming facilities that use game tokens.

Among the many table games played in casinos and other amusement facilities are baccarat and blackjack. In casinos, game tokens are used for these games.

In casinos, RFID tags are embedded in game tokens to verify that the amounts paid and collected in games are correct, and to identify and manage the location and owner of game tokens. Game tokens having RFID tags are known to the public and disclosed in Int'l Pat. App. Pub. No. WO 2008/120749.

Conventional casinos have used game tokens with RFID to read the RFID of the game tokens in the betting area and chip tray to identify the game tokens that exist in a specific area and prevent fraud. However, when the areas for placing game tokens are provided in close proximity to each other, such as the betting area and the chip tray, RFID readers in each area can also read the game tokens placed in the other area, or the electromagnetic waves generated by each reader can interfere with each other, making it impossible to accurately read the game tokens placed in close proximity. The problem is not limited to the reading between the betting area and the chip tray, but also applies to the upper and lower sections of the double chip tray and each section of the cabinet where the game tokens are stored.

SUMMARY

One aspect of the present disclosure a reading system for game tokens, comprising: a storage section that is provided in a game table and extending in a plane, for storing a game token equipped with an RFID tag; and a reading device having an antenna configured to generate an electromagnetic wave for reading the RFID tag of the game token stored in the storage section, wherein the reading device has a plurality of the antennas corresponding to a plurality of partial areas of the storage section so that the electromagnetic waves of the plurality of antennas do not read the RFID tag of the game token placed in a predetermined area other than the storage section where the game token is placed. This configuration reduces the possibility that the magnetic field generated by the antenna will read the game token placed in an area other than the storage area.

In the above reading system for game token, the plurality of antennas may have three or more wiring portions extending along a predetermined direction.

In the above reading system for game token, the antenna may have a dense portion and a sparse portion of wiring portions extending in the predetermined direction, the antenna may be configured so that a direction of electric current flowing in the wiring portions of each of the dense portions is in the same direction as each other.

In the above reading system for game token, the RFID tag may store at least an ID assigned to the game token, the reading system may further comprise a control unit configured to identify the IDs of the game tokens stored in the storage section, and the control unit may be configured to determine that there is one game token in the storage section with the ID assigned to the RFID tag when the RFID tag on the same game token is read in duplicate by the electromagnetic waves generated by the plurality of antennas.

In the above reading system for game token, the plurality of antennas may be positioned above or below the storage section.

In the above reading system for game token, the reading device may have a group of antennas comprising a plurality of antennas that enable the reading of an RFID tag provided in the game token placed in the same partial area of the plurality of partial areas.

In the above reading system for game token, the reading device may have one reader configured to read the RFID tag using all of the plurality of antennas included in one group of the antennas.

In the above reading system for game token, the reading device may have one reader configured to read the RFID tag using the plurality of antennas.

In the above reading system for game token, the reader may be configured to perform the reading multiple times by changing the antenna used.

In the above reading system for game token, the reading device may be configured to perform the reading multiple times by changing the antenna to be used among the plurality of antennas.

In the above reading system for game token, the storage section may be located in the vicinity of a betting area where game participants place the game tokens, the predetermined direction may be a direction from the storage section to the betting area, and the wiring portions extending in the predetermined direction may be arranged in a striped pattern over the entirety of the storage section.

In the above reading system for game token, the game table may have a betting area where the game participant places the game token, the predetermined direction may be a direction perpendicular to the direction from the storage section to the betting area, and the wiring portions extending in the predetermined direction may be arranged in a striped pattern over the entirety of the storage section.

In the above reading system for game token, three or more of the wiring portions extending along the predetermined direction may be included in one antenna.

In the above reading system for game token, the plurality of antennas may be arranged such that the wiring portions overlap each other.

The above reading system for game token may further comprise a collected game token storage section adjacent to the storage section and configured to temporarily store the game token collected from a player, wherein the collected game token storage section may comprise an antenna for the collected game token different from the plurality of antennas provided for the plurality of partial areas of the storage section.

The above reading system for game token may further comprise a shielding member provided between the storage section and the collected game token storage section, and configured to prevent the plurality of antennas corresponding to the plurality of partial areas of the storage section from reading the RFID tag of the game token in the collected game token storage section and/or prevent the antenna for the collected game token from reading the RFID tag of the game token in the storage section.

In the above reading system for game token, the RFID tag may store at least an ID assigned to the game token, the reading system may be configured such that the plurality of antennas provided for the plurality of partial areas of the storage section do not read the RFID tag of the game token in the collected game token storage section, the reading system may further comprise a control unit configured to identify the IDs of the game tokens stored in the storage section and the collected game token storage section, the control unit may be configured to determine that the game token to which the ID is assigned is present in the storage section when the ID read by the antenna in the storage section overlaps with the ID read by the antenna for collected game token.

In the above reading system for game token, the RFID tag may store at least an ID assigned to the game token, the reading system may be configured such that the antenna for collected game token does not read the RFID tag of the game token in the storage area, the reading system may further comprise a control unit configured to identify the IDs of the game token stored in the storage section and the collected game token storage section, the control unit may be configured to, when the ID read by the antenna in the storage section overlaps with the ID read by the antenna for collected game token, determine that the game token with the ID assigned is present in the collected game token storage section.

One aspect of the present disclosure is a reading system for game token comprising: a game token storage area configured to store the game token; a betting area in which game participant places the game token; and a reading device configured to read a RFID tag provided in the game token, wherein the reading device has an antenna located in the betting area, the antenna has wiring portions extending in a direction along a boundary between the game token storage area and the betting area and wiring portions extending in a direction across the boundary, and a total length of the wiring portions extending in the direction across the boundary is longer than a total length of the wiring portions extending in the direction along the boundary. This configuration reduces the possibility that the magnetic field generated by the antenna will read the game token placed outside the betting area.

In the above reading system for game token, the antenna may form a figure-8 shape by intersecting one of the wiring portions extending in a direction across the boundary so that one of the wiring portions straddles the other one.

In the above reading system for game token, the reading device may have a plurality of the antennas, and the plurality of antennas may be arranged so as to have overlapping portions.

In the above reading system for game token, the reading device may be configured to read a plurality of game token by simultaneously using two or more of the plurality of antennas having overlapping portions of each other.

One aspect of the present disclosure is a reading system for game token comprising: a storage section provided in a game table and configured to store the game token equipped with an RFID tag; a first reading device equipped with a first antenna configured to generate an electromagnetic wave to read the RFID tag of the game token stored in the storage section; a betting area in which a game participant places the game token; and a second reading device configured to read the RFID tag in the game token, wherein the first reading device has a plurality of the first antennas corresponding to a plurality of areas consist of the storage section, so that the electromagnetic waves of the plurality of first antennas do not read the RFID tag of the game token placed in the betting area where the game token is placed, the second reading device has a second antenna located in the betting area, the second antenna has wiring portions extending in a direction along a boundary between the storage area and the betting area and wiring portions extending in a direction across the boundary, and the reading system for game token is configured such that a total length of the wiring portions extending in the direction across the boundary is longer than a total length of the wiring portions extending in the direction along the boundary. This configuration reduces the possibility of the magnetic fields generated by the first and second antennas interfering with each other even when the first and second reading devices are used simultaneously.

One aspect of the present disclosure is a reading system for game token comprising: a game token storage area configured to store the game token equipped with an RFID tag; a betting area in which a game participant places the game token; a reading device configured to the RFID tag in the game token; and a control unit, wherein the reading device has antennas at each of the game token storage area and the betting area, respectively, the reading device configured to use the antennas to read the game token in the game token storage area and the game token in the betting area at independent times, the control unit is configured to be able to identify whether the read game token is located in the game token storage area or in the betting area, the system is configured to be able to determine whether the game token is placed in the game token storage area or in the betting area.

In the above reading system for game token, the control unit may be configured to independently determine an increase or decrease of the game tokens placed in the game token storage area and an increase or decrease of the game tokens placed in the betting area.

In the above reading system for game token, the control unit may be configured to detect a movement of the game token between the game token storage area and the betting area based on the increase or decrease of the game token determined.

In the above reading system for game token, the control unit may be configured to, based on a game result, determine that the game token moved from the betting area to the game token storage area at a predetermined timing is a collected game token.

In the above reading system for game token, the control unit may be configured to, based on the game result, determine the game token moved from the game token storage area to the betting area at a predetermined timing as a redemption chip.

One aspect of the present disclosure is A reading system for game token comprising: a game token placement section configured to place a game token having an RFID tag with an ID recorded thereon; a reading device having a plurality of antennas configured to generate an electromagnetic wave to read the RFID tag; and a control unit configured to identify the ID of the game token placed in the game token placement section, wherein the plurality of antennas are arranged in such a way that they have overlapping portions in their respective reading ranges where the RFID tag can be read by the electromagnetic waves generated by each of the antennas, and the control unit is configured so that when the RFID tags on the same game token are read in duplicate by the electromagnetic waves generated by the plurality of antennas, the control unit determines that there is one game token with the ID stored in the RFID tag in the game token placement section.

One aspect of the present disclosure is a reading system for game token comprising: a game token having an RFID tag on which an ID is recorded; a chip placement section configured to place the game token; a reading device equipped with a plurality of antennas configured to generate electromagnetic waves for reading the RFID tag; and a control unit configured to identify the ID of the game token placed in the game token placement section, wherein the plurality of antennas are arranged in such a way that they have overlapping portions in their respective reading ranges where the RFID tag can be read by the electromagnetic waves generated by each of the antennas, and the control unit is configured so that when the RFID tags on the same game token are read in duplicate by the electromagnetic waves generated by the plurality of antennas, the control unit determines that there is one game token with the ID stored in the RFID tag in the game token placement section. This configuration reduces the possibility of reading off the RFID of the game token.

One aspect of the present disclosure is a reading system for game token comprising: a storage section having an upper storage section and a lower storage section configured to place a game token equipped with an RFID tag; an upper reading device configured to read the RFID tag of the game token placed in the upper storage section; a lower reading device configured to read the RFID tag of the game token placed in the lower storage section; and a control unit, wherein the upper storage section is movable from top of the lower storage section to other areas, the lower storage section is closed when the upper storage section is stacked on top of the lower storage section, and the lower storage section is opened by moving the upper storage section to the other area to allow inserting and removing chips from the lower storage section, at least one of the upper reading device or the lower reading device is equipped with a plurality of antennas, and the control unit is configured to be able to use the upper reading device and the lower reading device to distinguish and identify the game token placed in the upper storage section from the game token placed in the lower storage section. This configuration makes it easier to distinguish and manage the game token placed in the upper storage section from those in the lower storage section.

In the above reading system for game token, the control unit may be configured to distinguish and identify the game tokens placed in the upper storage section and the game tokens placed in the lower storage section based on a reading result of the RFID tags read by the upper reading device and/or a reading result of the RFID tags read by the lower reading device while the upper storage section is moved to the other area.

In the above reading system for game token, the upper reading device may be equipped with a plurality of antennas, and the upper reading device may be configured not to read the RFID tags of the game tokens placed in the lower storage section when the lower housing section is closed.

In the above reading system for game token, the control unit may be configured to: identify the game token placed in the upper storage section based on the result of a reading performed using the upper reading device; identify the game tokens placed in the lower and upper storage sections using the lower reading device; and identify the game tokens placed in the lower storage section by subtracting the game tokens identified using the upper reading device from the game tokens identified using the lower reading device.

In the above reading system for game token, the lower reading device may be equipped with a plurality of antennas, and the lower reading device may be configured not to read the RFID tag of the game token placed in the upper storage section.

In the above reading system for game token, the control unit may be configured to: identify the game token placed in the lower storage section based on a result of a reading performed using the lower reading device; identify the game tokens placed in the upper and lower storage section using the upper reading device; and identify the game tokens placed in the upper storage section by subtracting the game tokens identified using the lower reading device from the game tokens identified using the upper reading device.

In the above reading system for game token, the control unit may be configured to be able to distinguish and identify the game tokens placed in the upper chamber from the game tokens placed in the lower storage section using the upper reading device and the lower reading device while the lower storage section is closed.

One aspect of the present disclosure is a reading system for game token comprising: a storage unit configured to store the game token having an RFID tag; a reading device configured to read the RFID tag in the game token; and a control unit, wherein the storage section has a first storage section and a second storage section, both of which can be opened and closed independently, the reading device has a first reading device configured to read the game token stored in the first storage section and a second reading device configured to read the game token stored in the second storage section, the first reading device is configured not to read the game token stored in the second storage section when the second storage section is closed, and/or the second reading device is configured not to read the game token stored in the first storage section when the first storage section is closed. This configuration makes it easier to distinguish and manage the game token placed in the first storage section from the game token placed in the second storage section.

In the above reading system for game token, the control unit may be configured to distinguish and identify the game token placed in the first storage section from the game token placed in the second storage section using reading results of the first and second reading device.

One aspect of the present disclosure is a reading system for game token comprising: a storage section configured to store the game token having an RFID tag; a reading device configured to read the RFID tag in the game token; and a control unit, wherein the storage section has a first storage section and a second storage section, both of which can be opened and closed independently, the reading device has a first reading device configured to read the game token stored in the first storage section and a second reading device configured to read the game token stored in the second storage section, the first reading device is configured not to read the game token stored in the lower storage section, and the second reading device is configured not to read the game token stored in the upper storage section. This configuration makes it easier to distinguish and manage the game token placed in the first storage section from the game token placed in the second storage section.

In the above reading system for game token, the first reading device may be configured not to read the game token stored in the second storage section when the first storage section is open and the second storage section is closed, and/or the second reading device may be configured not to read the game token stored in the first storage section when the second storage section is open and the first storage section is closed.

In the above reading system for game token, the first reading device may be configured not to read the game token stored in the second storage section when the first storage section is closed and the second storage section is open, and/or the second reading device may be configured not to read the game token stored in the first storage section when the second storage section is closed and the first storage section is open.

One aspect of the present disclosure is a reading system for game token comprising: a storage section configured to place the game token having an RFID tag; a reading device; and a control unit, wherein the storage section consists of a plurality of independently openable housing sections, and the control unit is configured to, when at least one of the plurality of housing sections are in the open state, perform a first reading using the reading device to identify the game token placed in a housing section which is closed. This configuration makes it easier to distinguish and manage the game tokens placed in each of the housing sections from each other.

In the above reading system for game token, the control unit may be configured to, when all of the plurality of housing sections are closed, perform a second reading using the reading device and compare a result of the first reading with a result of the second reading to identify the game token stored in a storage section which was open immediately before.

In the above reading system for game token, the control unit is configured to use the reading results of the first and second reading device to distinguish and identify the game token placed in the upper storage section from the game token placed in the lower storage section.

EMBODIMENTS OF THE DISCLOSURE

Figure 1:
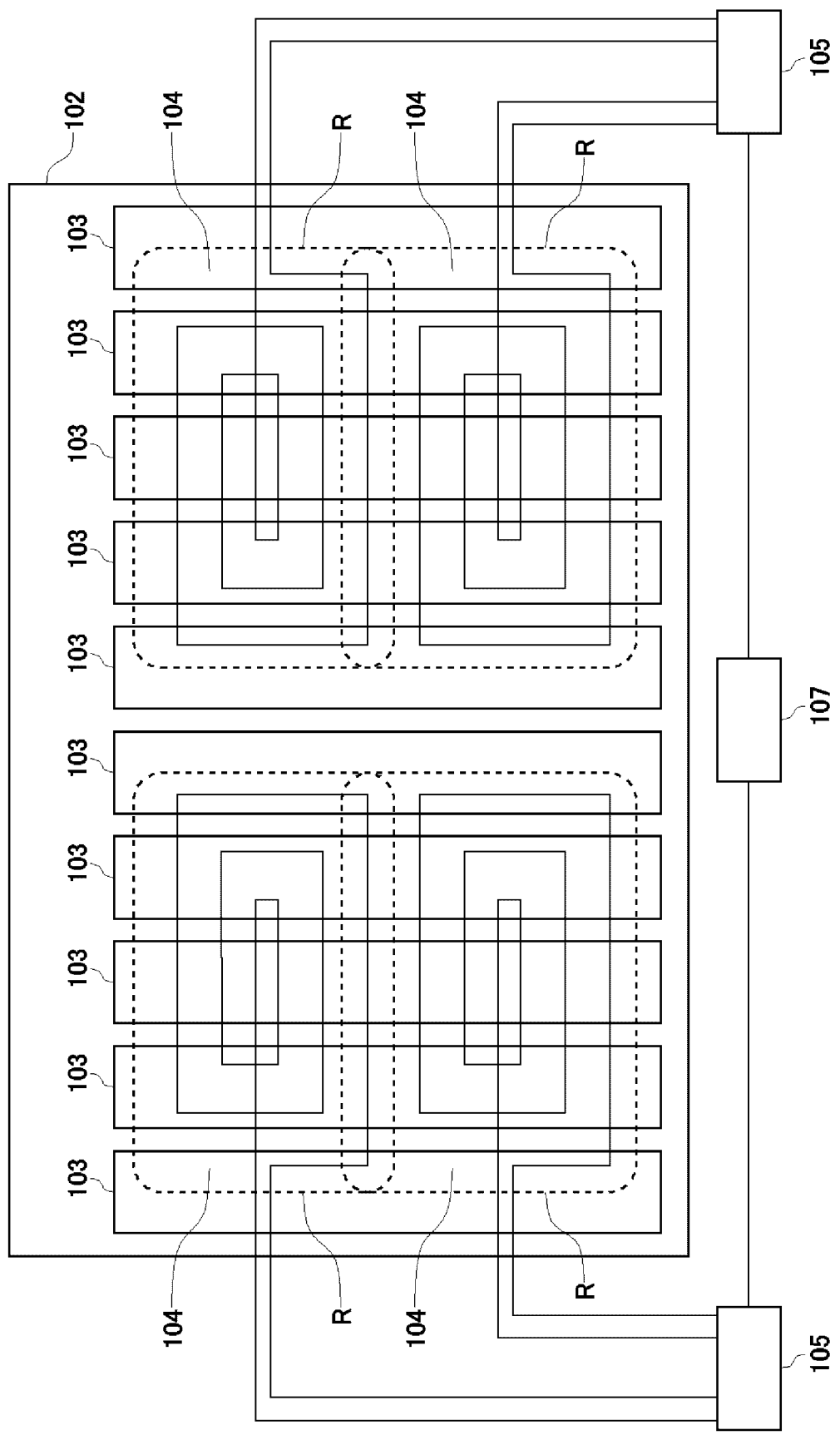
FIG. 1 shows a schematic diagram of a reading system in the first embodiment of the present disclosure.

First, a reading system for game tokens of the first embodiment of the present disclosure will be described. FIG. 1 is a schematic diagram of the reading system 101 of the present disclosure. The reading system 101 is used in casinos for holding game tokens owned by dealers and for managing the game tokens by reading the RFID tags in the game tokens.

The reading system 101 is equipped with a storage tray 102 for holding game tokens, antennas 104 for reading the RFID tags on the game tokens, an RFID reader 105 for controlling the antenna 104, and a control unit 107 for determining and managing the held game tokens based on the RFID reading results. The RFID reader 105 controls the antennas 104. The combination of the antennas 104 and the RFID reader 105 may correspond to the reading device.

The storage tray 102 is used to place the game tokens. The storage tray 102 may be provided with grooves 103 for holding the game tokens, and the game tokens may be placed in the grooves 103.

The reading system 101 is provided with a plurality of antennas 104 that form magnetic fields by generating electromagnetic waves to read RFID tags of game tokens held in the storage tray 102, and the RFID reader 105 that controls the antennas 104. The reading system 101 may be equipped with a plurality of RFID readers 105 or only one RFID reader 105. When multiple RFID readers 105 are provided, the plurality of RFID readers 105 may be used one by one in order to perform reading, or several of the plurality of RFID readers 105 may be used simultaneously to perform reading. By using a plurality of antennas 104 to read the game tokens held in the storage tray 102, the magnetic fields generated by the antennas 104 can be reduced because the area that can be read by the individual antennas 104 need only be a smaller area than before, and the reading system 101 is less likely to cause interference with the magnetic field generated by another reading device for reading game tokens placed in the vicinity of the reading system 104 (such as in the betting area). Furthermore, the effect of the electromagnetic waves generated by the antennas 104 on the body of the dealer can also be expected to be reduced.

The antenna 104 generates electromagnetic waves and forms a magnetic field Z to enable the reading of RFID tags provided in the game tokens that exist in a predetermined range R. The plurality of antennas 104 provided in the reading system 101 may have overlapping portions of the predetermined range R that each antenna 104 enables to read. The antennas 104 themselves may also have overlapping portions. The specific configuration of the antennas 104 will be described later.

The RFID reader 105 is connected to the antenna 104 and uses the antenna 104 to read RFID tags. One RFID reader 105 may be connected to multiple antennas 104, or to only one antenna 104. When one RFID reader 105 uses multiple antennas 104, the multiple antennas 104 may be used one by one in order to read the tag, or several of the multiple antennas 104 may be used simultaneously to read the tag.

The control unit 107 is connected to the RFID reader 105, and based on the reading results using the RFID reader 105, the ID of the game token held in the storage tray 102 is identified and managed. Furthermore, information such as the type, amount, and number of the game tokens held in the storage tray 102 may be determined based on the identified IDs, and the determined information may be stored.

Figure 2:
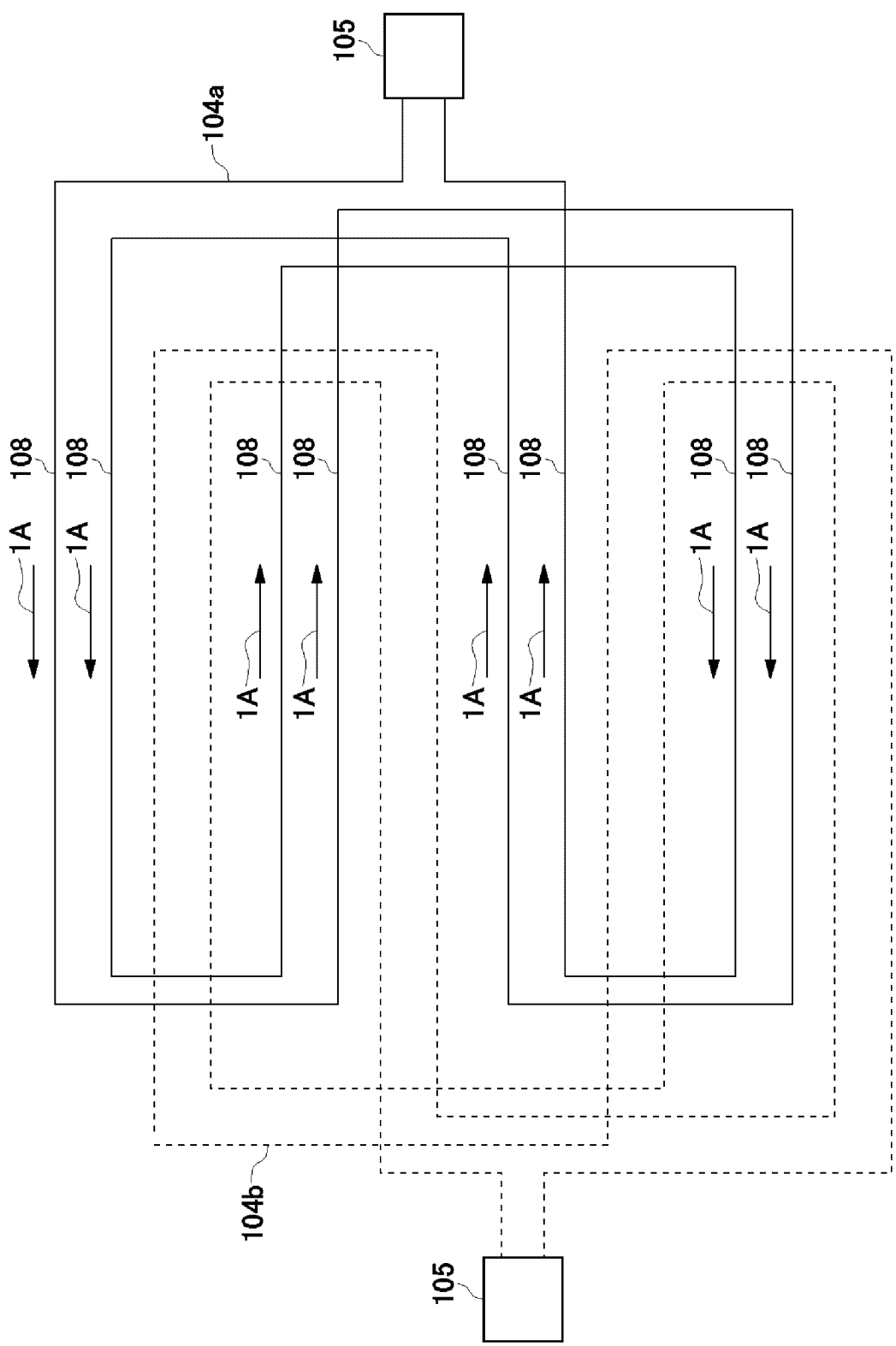
FIG. 2 shows an illustration of an antenna in the first embodiment of the present disclosure.

Next, a specific configuration of the antenna 104 will be described using FIG. 2. FIG. 2 shows a wiring of the antenna 104 in the first embodiment of the present disclosure. The antenna should be placed above or below the storage tray 102. The antenna 104 may be installed by placing a substrate (not shown) below the storage tray 102 on which the antenna is placed, or the antenna 104 may be installed directly on the storage tray 102 without using a substrate.

The arrangement example in FIG. 2 shows a configuration in which two antennas 104a and 104b are used to enable reading of RFID tags of the game tokens within the same range. In this arrangement, the antennas 104a and 104b have the same configuration, so first the configuration of the antennas using antenna 104a will be explained. The antenna 104a includes a plurality of wiring portions 108 extending in a predetermined direction (horizontal direction in the figure), and the wiring portions 108 extending in the predetermined direction of the antenna 104a are arranged more densely than in conventional antennas. In such an arrangement, three or more wiring portions 108 extending in the predetermined direction should be provided. The dense presence of the wiring portions 108 extending in the predetermined direction reduces the number of game tokens that must be made readable by the magnetic field formed by each of the wiring portions 108 extending in the predetermined direction. Therefore, the magnetic field generated by each of the wiring portions 108 extending in the predetermined direction can be small and is less likely to interfere with the magnetic field generated by another reader for reading the game tokens in the vicinity of the reading system 101 (such as in the betting area). Furthermore, the effect of the electromagnetic waves generated by the antenna 104A on the body of the dealer can also be expected to be reduced.

The above configuration is not limited to the arrangement as shown in the arrangement example in FIG. 2, but may be realized, for example, by arranging the wiring portions in a spiral shape.

Furthermore, in the arrangement example of FIG. 2, the antenna 104a has dense and sparse portions of wiring portions 108 extending in the predetermined direction. When an electric current flows through the antenna 104a, the direction 1A of the current flowing through the wiring portions included in the respective dense portions is in the same direction, so the magnetic fields generated by the respective wiring portions do not cancel each other out. In addition, when the direction 1A of the current flowing in the wiring on both sides of the sparse portions is in the opposite direction, the magnetic fields spreading in the front-back direction have different directions, so they can be expected to cancel each other out and prevent the magnetic fields from spreading more than necessary. In addition, the magnetic field spreading in the vertical direction has the same direction, so it is expected to have the effect of making it easier to read when the game token C is in a fallen down state.

In the arrangement shown in FIG. 2, two antennas 104a and 104b are used to read the game tokens within the same range. By using these antennas at different times, there is less risk of missing the RFID tag without interfering with the reading of the respective antennas. The process when two antennas 104a and 104b read the same game token be described later.

Figure 3:
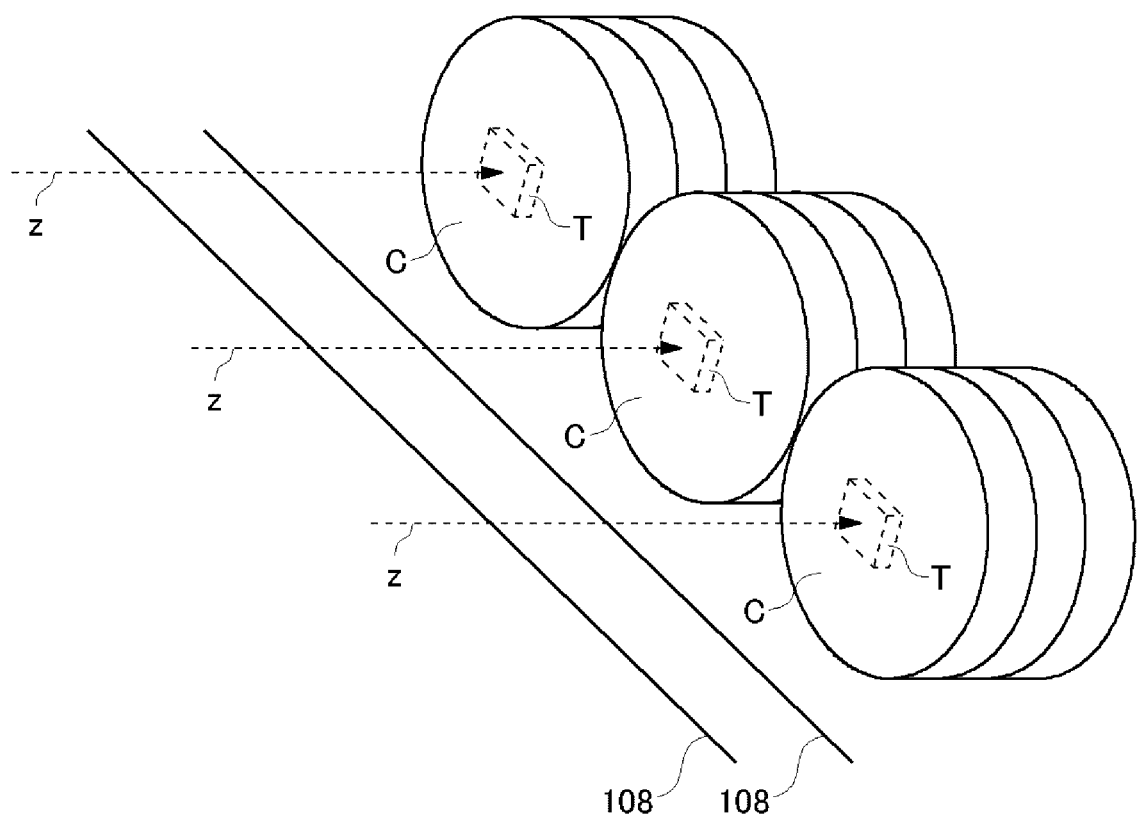
FIG. 3 shows an example of an antenna arrangement in the first embodiment of the present disclosure.

In an arrangement such as that shown in FIG. 3, the wiring portion 108 extending in a predetermined direction extends in a direction orthogonal to the stacking direction of the game tokens C arranged in the storage tray 102. In such an arrangement, the magnetic field Z generated by the antenna 104 spreads in a direction orthogonal to the RFID tag T provided in the game token C placed in the storage tray 102, thereby making it easier to read the RFID tag T.

When such an arrangement is adopted, it is desirable that the number of game tokens C lined up in the direction orthogonal to the wiring portion 108 extending in the predetermined direction to be made readable by the magnetic field Z formed by the wiring portion 108 in the respective predetermined direction when the maximum amount of game tokens C is placed in the storage tray 102 is eight or less. These configurations may be realized by the wiring portion 108 extending in the predetermined direction contained in one antenna 104, or by summing the wiring portion 108 extending in the predetermined direction contained in a plurality of antennas.

Figure 4:
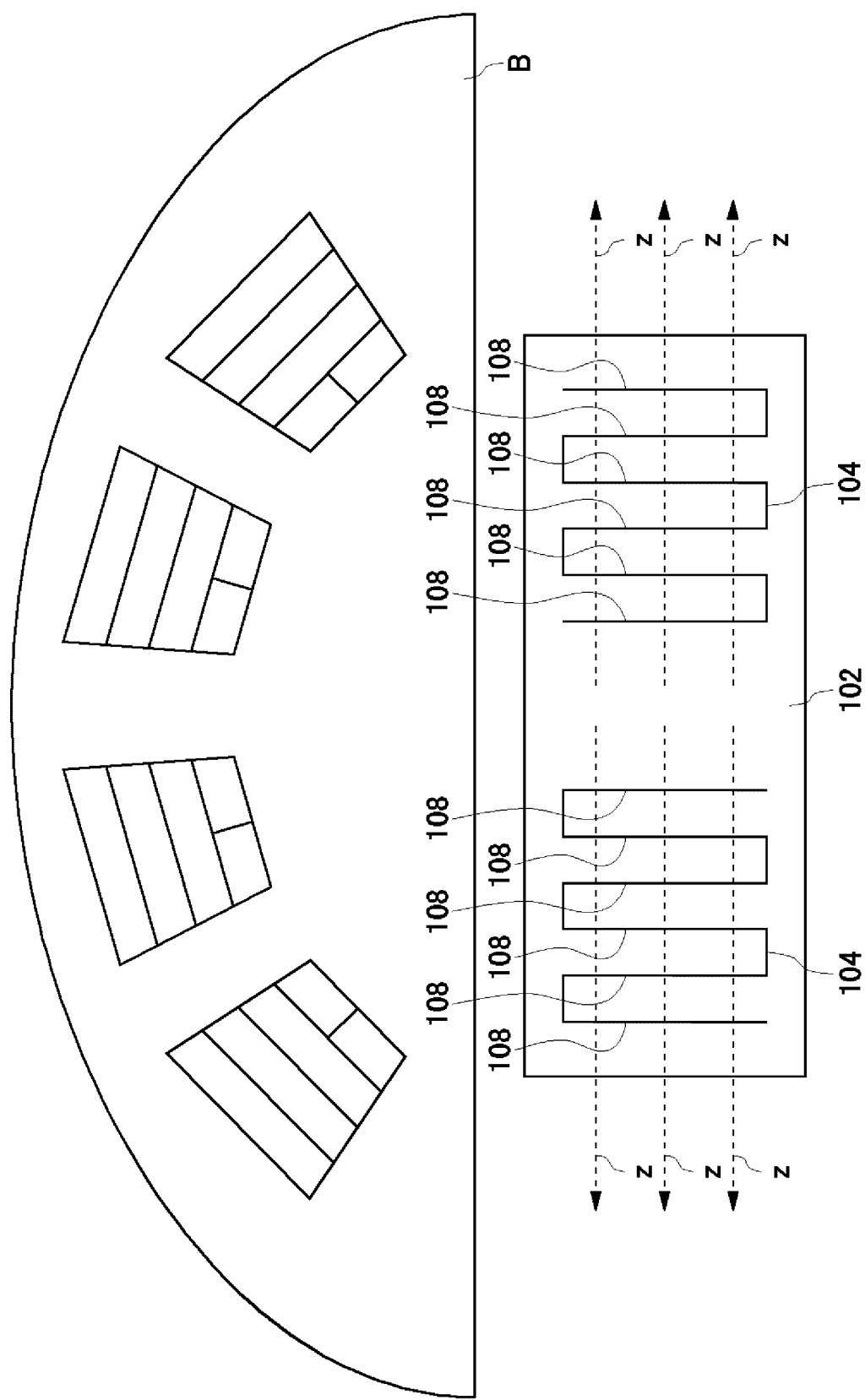
FIG. 4 shows an example of an antenna arrangement in the first embodiment of the present disclosure.

On the other hand, in FIG. 4, the wiring portion 108 extending in the predetermined direction (vertical direction in FIG. 4) extends in a direction perpendicular to the boundary between the storage tray 102 and the betting area B in the vicinity of a storage device, where game tokens are placed, and the wiring portion 108 in the predetermined direction is arranged in a striped pattern throughout the storage tray 102. This arrangement makes it difficult for the magnetic field Z generated by the antenna 104 of the reader 101 to spread in the direction toward the betting area B, thus making it difficult to read the RFID tag provided in the game token C placed in the betting area B. In addition, the magnetic field generated by another reader to read the game token placed in the betting area B is less likely to interfere with the magnetic field generated by the other reader, so that reading can be performed accurately even when the reader 101 and another reader are used simultaneously.

Figure 5:
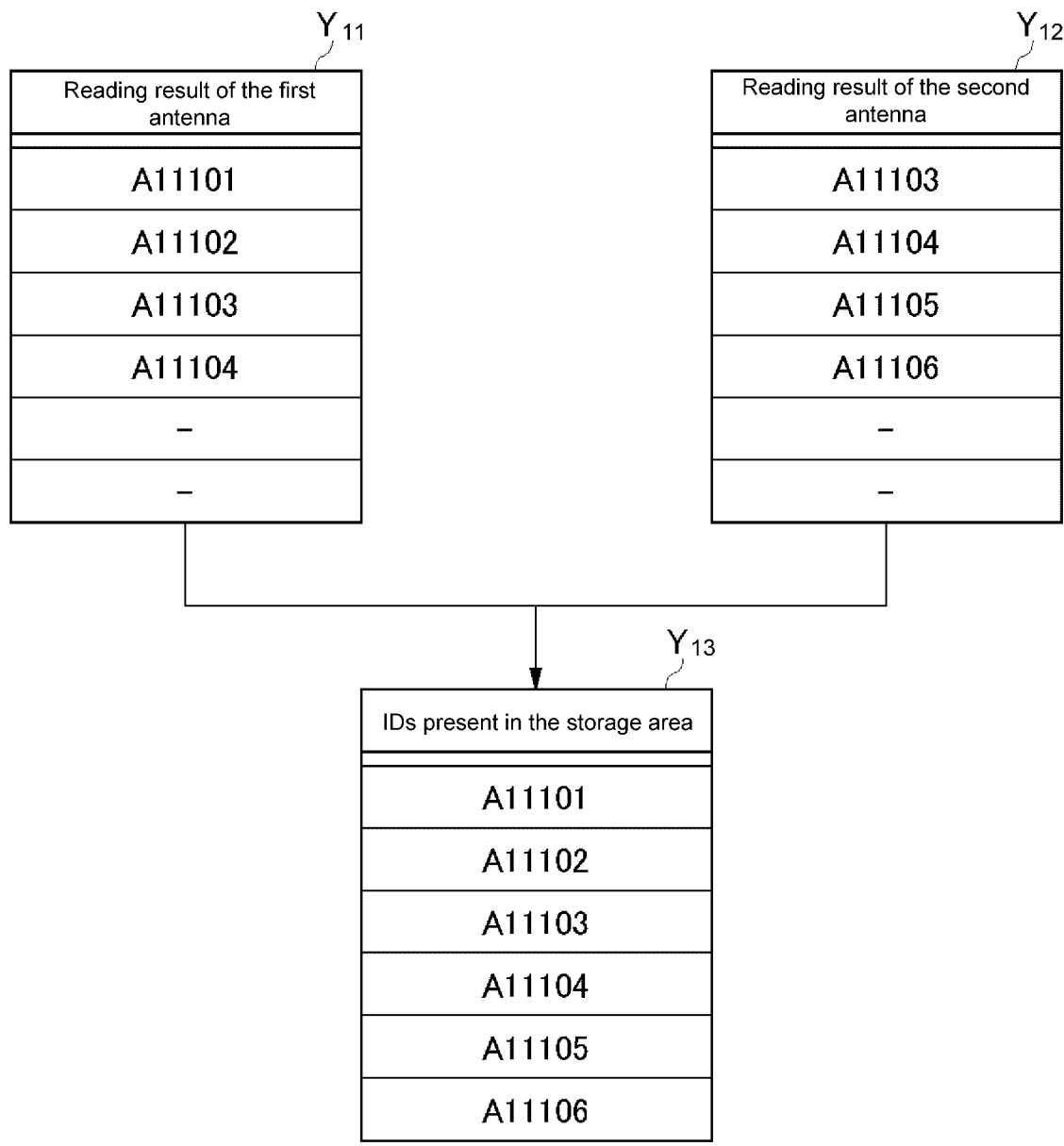
FIG. 5 shows an illustration of a method of identifying IDs in the first embodiment of the disclosure.

FIG. 5 shows the process performed by the control unit 107 when the same game token is read in duplicate in readings performed using different antennas 104. The reading result Y11 represents the IDs of the game tokens C that was read in the reading using the first antenna 104. The reading result Y12 represents the IDs of the game tokens C read by the reading using the second antenna 104, which is different from the first antenna 104. The control unit 107 obtains the reading result Y13 for the IDs contained in at least one of the reading results Y11 and Y12 by determining that there is one game token C in the storage tray 102 that has been assigned the ID, and determines the ID of the game token C in the storage tray 102.

A collected chip storage tray may be provided adjacent to the above storage tray 102. The collected chip section has grooves similar in configuration to the grooves 103 of the storage tray 102. The grooves of the collected chip section are formed to extend in a direction parallel to the grooves 103 of the storage tray 102. The collected chip storage tray is used to temporarily hold game tokens collected from players who lost the game. The collected chip storage tray is provided with antennas for collected chips different from the plurality of antennas 104 provided for the plurality of partial areas of the storage tray 102. The grooves of the collected chip storage tray may be formed to extend in a direction orthogonal to the plurality of grooves 103 of the storage tray 102.

In the reading system 101, a shielding member is installed between the storage tray 102 and the collected chip storage tray. The shielding member can prevent the plurality of antennas 104 corresponding to the plurality of partial areas of the storage tray 102 from reading the RFID tags of the game tokens in the collected chip storage tray. The shielding material can also prevent the antennas for collected chips from reading the RFID tags of the game tokens in the storage tray 102. This makes it possible to read the game token (collected chip) held in the collected chip storage tray separately from the game tokens held in the storage tray 102.

The RFID tag embedded in the game token stores at least the ID assigned to the game token. The plurality of antennas 104 provided corresponding to the plurality of partial areas of the storage tray 102 are configured not to read the RFID tag of the game token in the collected chip storage tray. The control unit 107 also identifies the IDs of the game tokens held in the storage tray 102 and the collected chip storage tray. If the ID read by the antenna 14 of the storage tray 102 overlaps with the ID read by the antenna for collected chips, the control unit 107 determines that the game token to which the ID is assigned exists in the storage tray 102.

As an alternative to the above, the antenna for collected chips may be configured not to read the RFID tag of the game token in the storage tray 102. In this case, when the ID read by the antenna 104 of the storage tray 102 and the ID read by the antenna for collected chips overlap, the control unit 107 determines that the game token to which the ID is assigned exists in the collected chip storage tray.

Figure 6:
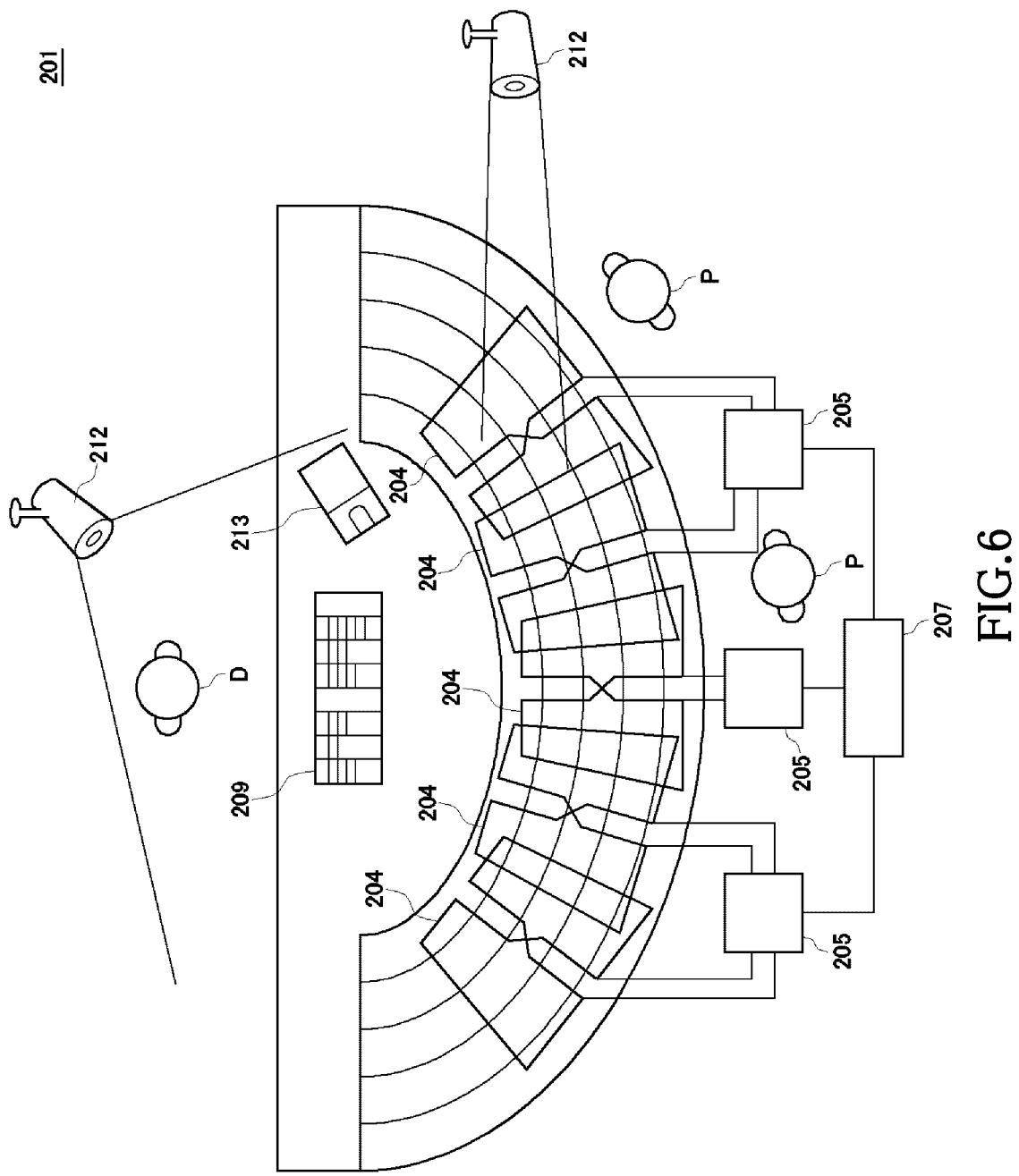
FIG. 6 shows a schematic diagram of a reading system in the second embodiment of the present disclosure.

Next, a reading system of the game token in the second embodiment of the present disclosure will be described. FIG. 6 is a schematic diagram of the reading system 201 of the present disclosure. The reading system 201 is used in a casino to manage game tokens C by reading RFID tags provided in the game tokens C placed on a game table by a game participant P.

The reading system 201 includes a betting area B for game participants P to place game tokens C, a storage area 209 for holding game tokens C owned by dealer D, an antenna 204 for reading the RFID tags in the game tokens C, an RFID reader 205 for controlling the antenna 104, and a control unit 207 that determines and manages the stored game tokens C based on the reading results using the RFID reader 205. The combination of the antenna 204 and the RFID reader 205 can correspond to a reading device.

The betting area B is used by the game participant P to place the game tokens C. A plurality of player positions may be provided in the betting area, and each player position may have a plurality of placement areas, one for each betting target.

The storage area 209 is used to hold game tokens C owned by the dealer D. The storage area 209 may be a chip tray or a vault.

The reading system 201 has a plurality of antennas 204 that generate electromagnetic waves to form a magnetic field to read the RFID tags of the game tokens C placed in the betting area B, and an RFID reader 205 that controls the antennas 204. The reading system 201 may be equipped with a plurality of RFID readers 205 or only one RFID reader 205.

The antenna 204 generates electromagnetic waves and forms a magnetic field to enable reading of RFID tags provided in the game tokens C that are present in a predetermined range. The plurality of antennas 204 provided in the reading system 201 may have overlapping portions of the predetermined range that each antenna 204 enables to be read, and the antennas 204 themselves may be arranged so as to overlap. The specific configuration of the antennas 204 will be described later.

The RFID reader 205 is connected to the antenna 204 and uses the antenna 204 to read RFID tags. One RFID reader 205 may be connected to multiple antennas 204, or to only one antenna 204. When one RFID reader uses multiple antennas 204, the multiple antennas 204 may be used one by one in order to read the tag, or several of the multiple antennas 204 may be used simultaneously to read the tag.

The control unit 207 is connected to the RFID reader 205, and based on the results of reading using the RFID reader 205, identifies and manages the ID of the game token C placed in the betting area B. Furthermore, information such as the type, amount, and number of game tokens C placed in the betting area B may be determined based on the identified ID, and the determined information may be stored. Furthermore, the system may be configured to compare the determined information with the information on the ID, type, number, amount, etc. of the game tokens C identified by other methods such as a camera, to determine whether there is any abnormality, and to issue an alert if there is any abnormality.

Figure 7:
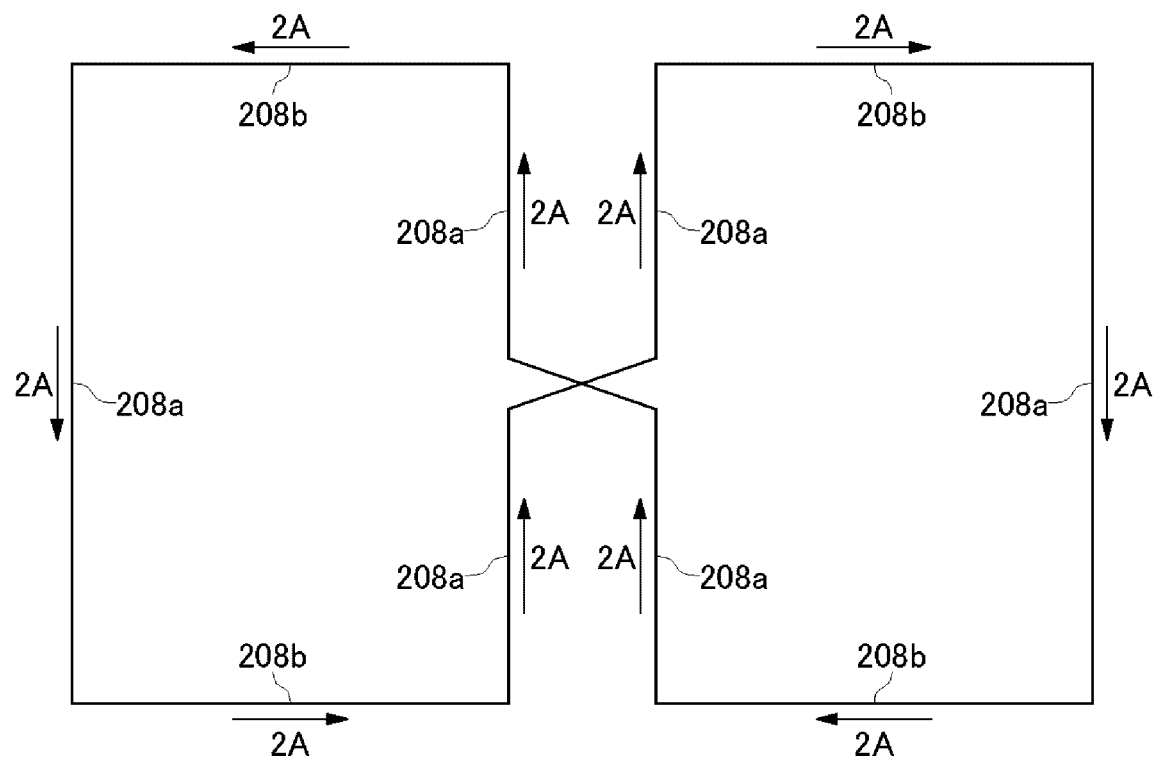
FIG. 7 shows an illustration of the antenna of the second embodiment of the present disclosure.

Next, the specific configuration of the antenna 204 will be described using FIG. 7. FIG. 7 shows wiring portions of the antenna 204 of the second embodiment of the present disclosure. The antenna 204 includes wiring portion 208a extending in the direction across the boundary and wiring portion 208b extending in the direction along the boundary. In this configuration, the antenna 204 is configured so that the total length of the wiring portion 208a extending in the direction across the boundary is longer than the total length of the wiring portion 208b extending in the direction along the boundary. This configuration makes it difficult for the magnetic field generated by the antenna to spread in the direction toward the storage area and the direction toward the dealer D. Therefore, the possibility of reading the game token in the storage area 209 becomes small. In addition, the effect of reducing the effect on the body of dealer D can be expected.

Figure 8:
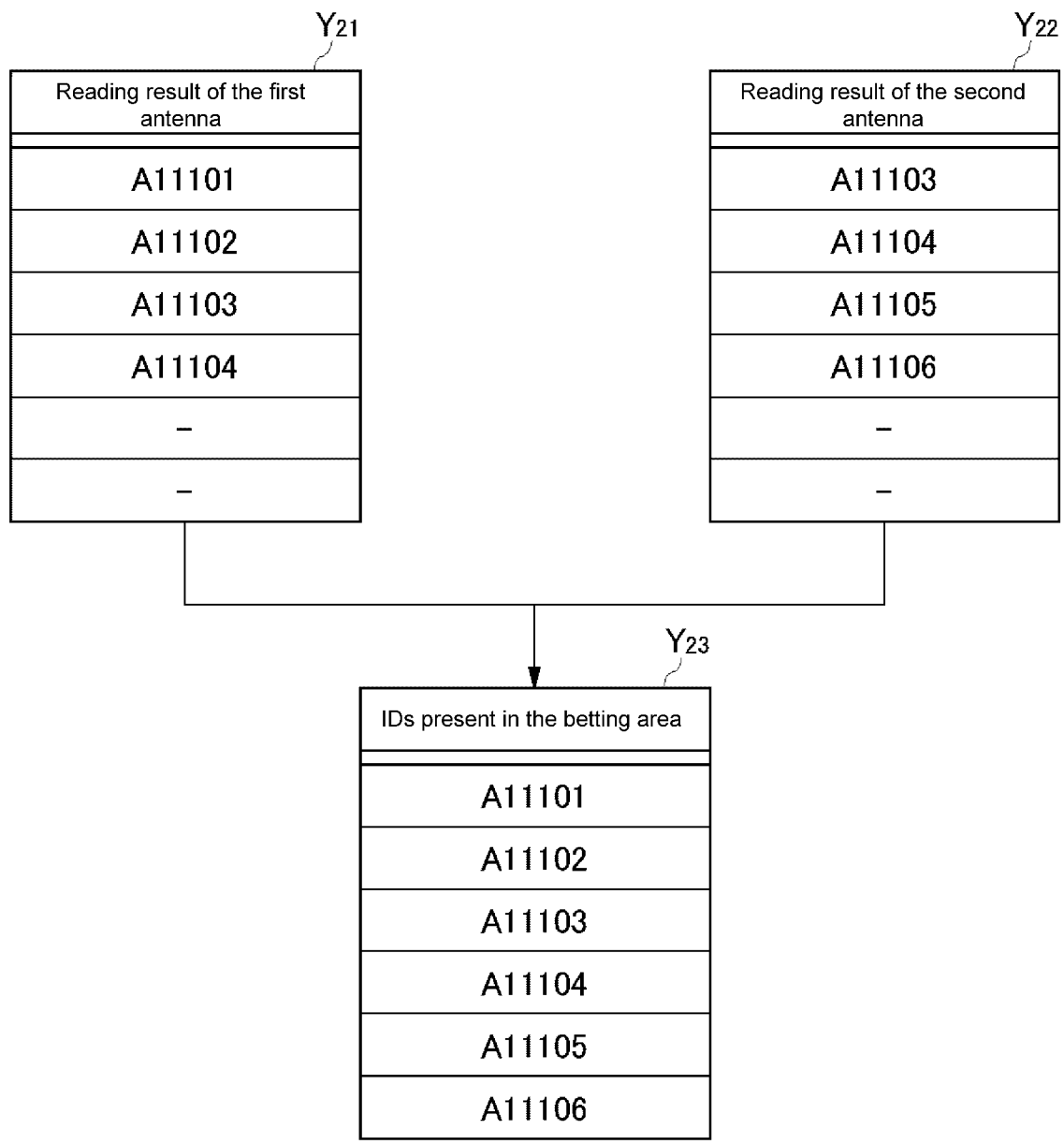
FIG. 8 shows an illustration of a method of identifying IDs in the second embodiment of the disclosure.

In addition, in FIG. 7, in the antenna 204 of the present disclosure, the wiring portions are arranged so that one of the wiring portions 208a extending in the direction across the boundary crosses over another wiring portion 208a extending in the direction across the boundary to form a figure-8 shape. With such an arrangement, in the wiring portions 208a adjacent to each other and extending in the direction across the boundary, the directions 2A of the current flowing in the wiring portion 208a when a current is applied are the same, therefore, the magnetic fields generated do not cancel each other out. Furthermore, in the wiring portions 208b extending in the direction along which it was close to each other, the directions 2A of the current flowing when the current is applied is in the opposite direction, so the magnetic fields generated cancel each other, and the effect of further reducing the effect on the storage area 209 can be expected.

In FIG. 8, the process performed by the control unit 207 when the same chip is read in duplicate in readings performed using different antennas 204 is described. The reading result Y21 represents the IDs of the game tokens C that were read in the reading using the first antenna 204. The reading result Y22 represents the IDs of the game tokens C read by the reading using the second antenna 204, which is different from the first antenna 204. The control unit 207 obtains the reading result Y23 for the IDs contained in at least one of the reading results Y21 and Y22 by determining that there is one game token C in the betting area B to which the ID is assigned, and determines the ID of the game token C in the betting area B.

In addition, the reading system 201 may be equipped with means for acquiring game information, such as a camera 212 and a win-loss determination device 213, etc., and the status of the game token C on the betting area B acquired from these means and the progress of the game may be compared with the status of the game token C on the betting area B acquired using the RFID reader 205. If there is an abnormality, the control unit 207 may be configured to issue an alert.

Figure 9:
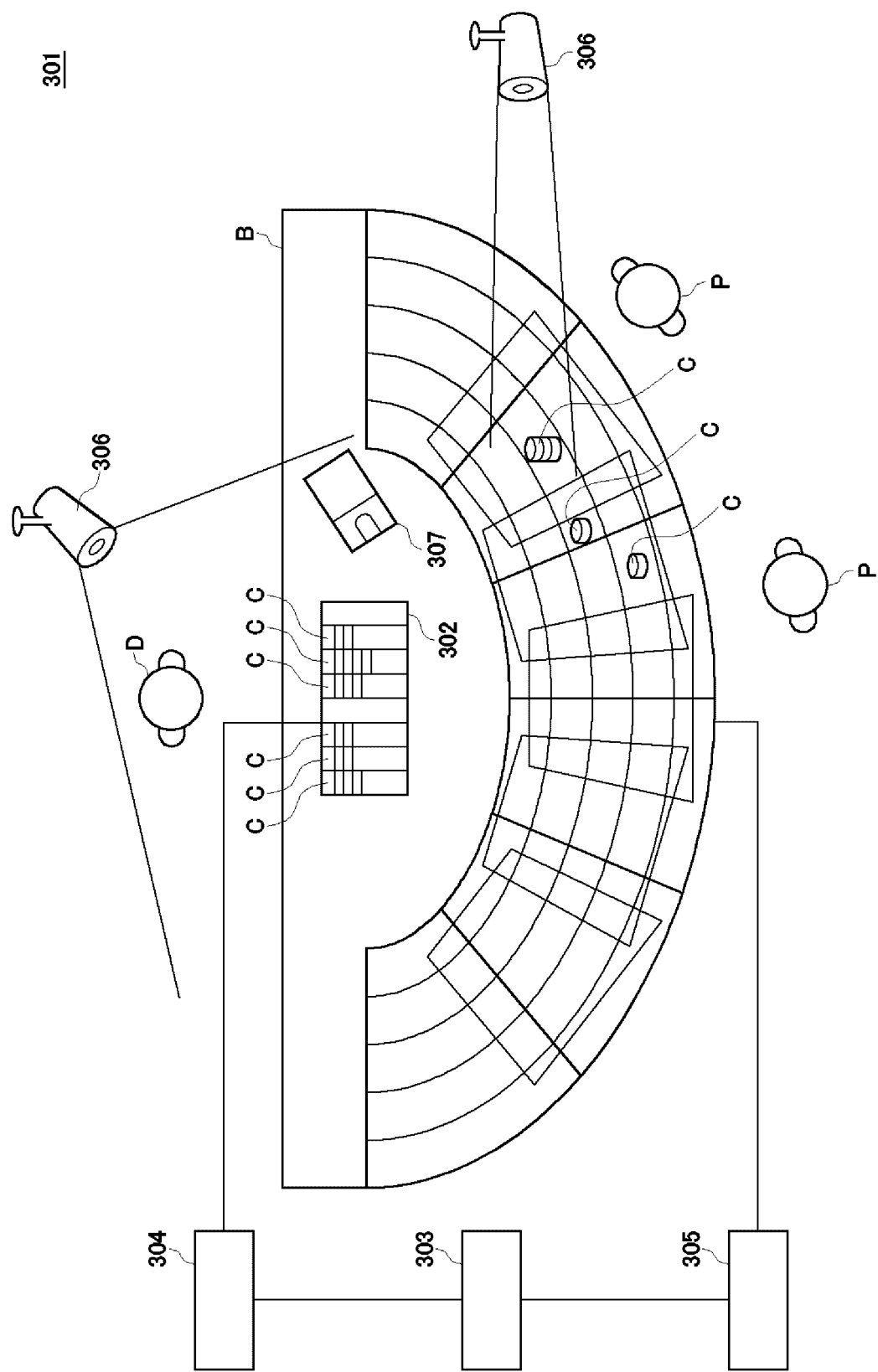
FIG. 9 shows a schematic diagram of a reading system in the third embodiment of the present disclosure.

Next, a third form of a reading system for game tokens of the present disclosure will be described. FIG. 9 is a schematic diagram of the reading system 301 of the present disclosure. The reading system 301 reads the RFID tags in the game tokens C owned by the dealer in the casino and stored in the storage area 302 and the game tokens C placed on the betting area B by the game participant P. The system distinguishes whether the game token C is in the storage area 302 or on the betting area B.

The reading system 301 is equipped with a betting area B for game participants P to place the game tokens C, a storage area 302 for holding the game tokens C owned by the dealer D; a betting area reading device 305 for reading the RFID tags of the game tokens C placed in the betting area B; a storage area reading device 304 for reading the RFID tags of the game tokens C stored in the storage area 302; and a control unit 303 for determining and managing the game tokens C stored based on the results of reading the RFID tags provided in the game tokens C present in the respective areas.

The storage area 302 is used for storing the game token C owned by the dealer D.

The reading system 301 has the storage area reading device 304 for reading the RFID tags of the game tokens C stored in the storage area 302, and betting area reading device 305 for reading the RFID tags in the game tokens C placed in the betting area B. The storage area reading device 304 and the betting area reading device 305 correspond to the combined antenna and RFID reader of the first and second embodiment described above, respectively. The storage area reading device 304 and the betting area reading device 305 do not take measures to stagger or synchronize the timing of reading, and may be controlled independently of each other, and can read the RFID tags of the game tokens C placed in their respective areas even if they are read at the same timing.

Since the specific configurations of the storage area reading device 304 and the betting area reading device 305 are the same as those of the first and second embodiments of the present disclosure, respectively, the description is omitted here.

The storage area reading device 304 and the betting area reading device 305 may be configured to repeatedly read at a predetermined timing, and the reading results may be stored in the control unit 303.

The control unit 303 is connected to the storage area reading device 304 and the betting area reading device 305, and identifies the IDs of the game tokens C placed in the respective areas based on the reading results of the storage area reading device 304 and the betting area reading device 305. Further, the control unit 303 may be configured to be able to ascertain the increase or decrease of the game tokens C placed in the respective areas based on the history of the information of the game tokens C identified based on the reading results of the storage area reading device 304 and the betting area reading device 305.

Further, based on the IDs of the game tokens C identified based on the reading result, the control unit 303 may determine that the game token C assigned with the ID has moved from one area to the other area when the ID that disappeared from one area is read in the other area.

Furthermore, the control unit 303 may determine that the game token C that moves from the betting area B to the storage area 302 at a predetermined timing is a collected chip, and the game token C that moves from the storage area 302 to the betting area B at a predetermined timing is a redeemed chip. In addition to this, events such as the purchase, redemption, or exchange of the game tokens C may be determined based on information on the disappearance, appearance, or movement of the game tokens C in the respective areas and the areas and timing in which these events occur.

Further, the reading system 301 may be equipped with means for obtaining game information, such as a camera 306 and a win/loss determination device 307, and if there is a discrepancy between the game state obtained from these means and the collected chips, redeemed chips, etc. determined based on the reading device in the respective area, the control unit 303 may issue an alert.

Figure 10:
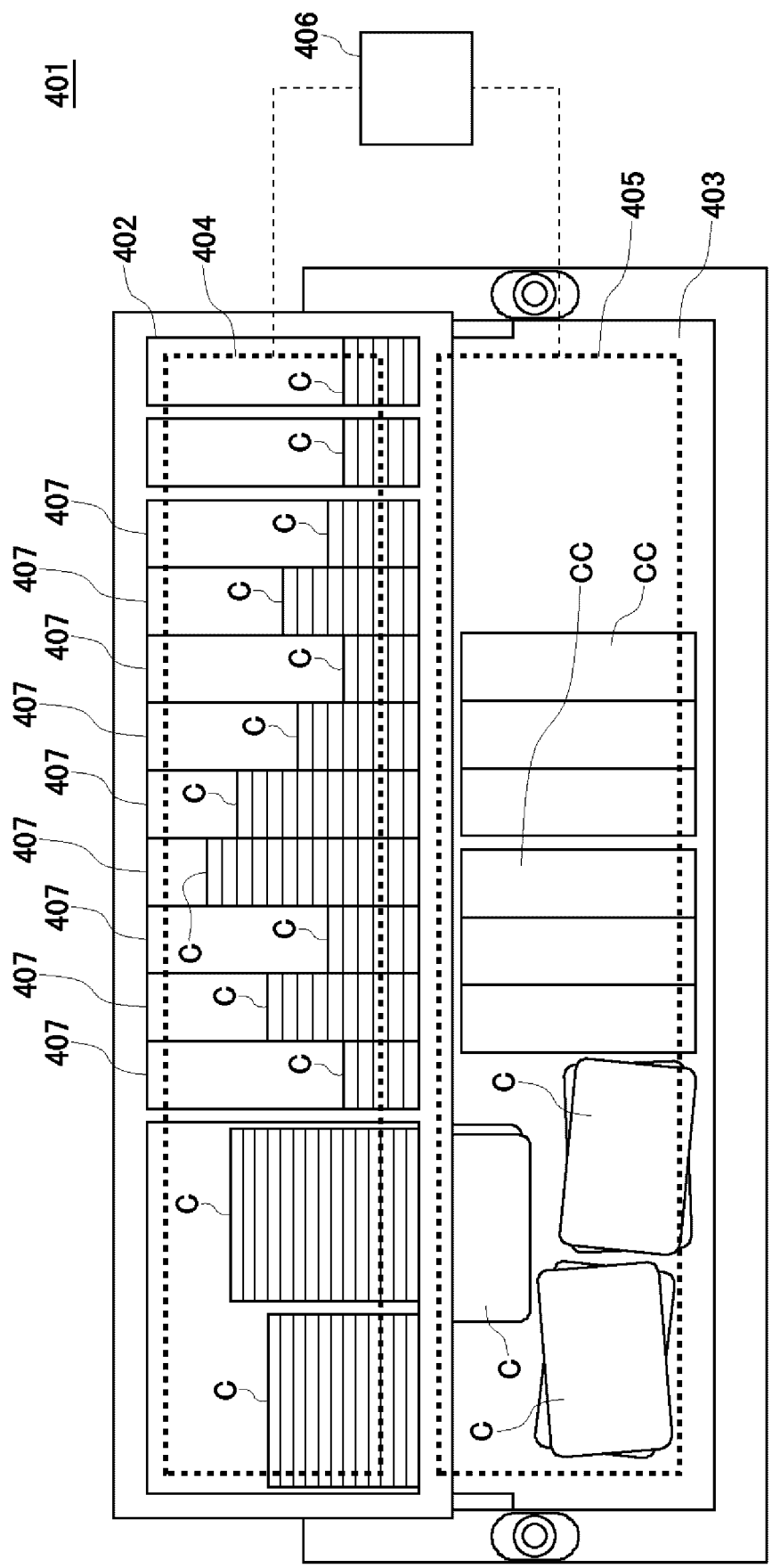
FIG. 10 shows a schematic diagram of a reading system in the fourth embodiment of the present disclosure.

The following is a description of a reading system for game tokens in the fourth embodiment of the present disclosure. FIG. 10 is a schematic diagram of the reading system 401 of the present disclosure. The reading system 401 is used in a casino to distinguish whether the game token C is in the upper or lower section of the double chip tray by reading the RFID tag provided in the game token C placed in the double chip tray on the game table by the dealer D.

The reading system 401 is provided with an upper storage tray 402 and a lower storage tray 403 for holding game tokens C, an upper reading device 404 and a lower reading device 405 for reading an RFID tags provided on the game tokens C, and a control unit 406 for determining and managing the held game tokens C based on the reading result of the RFID tags. In this embodiment, the upper reading device and the lower reading device refer to the antenna for reading the RFID tag and the RFID reader that controls the antenna together.

Figure 11:
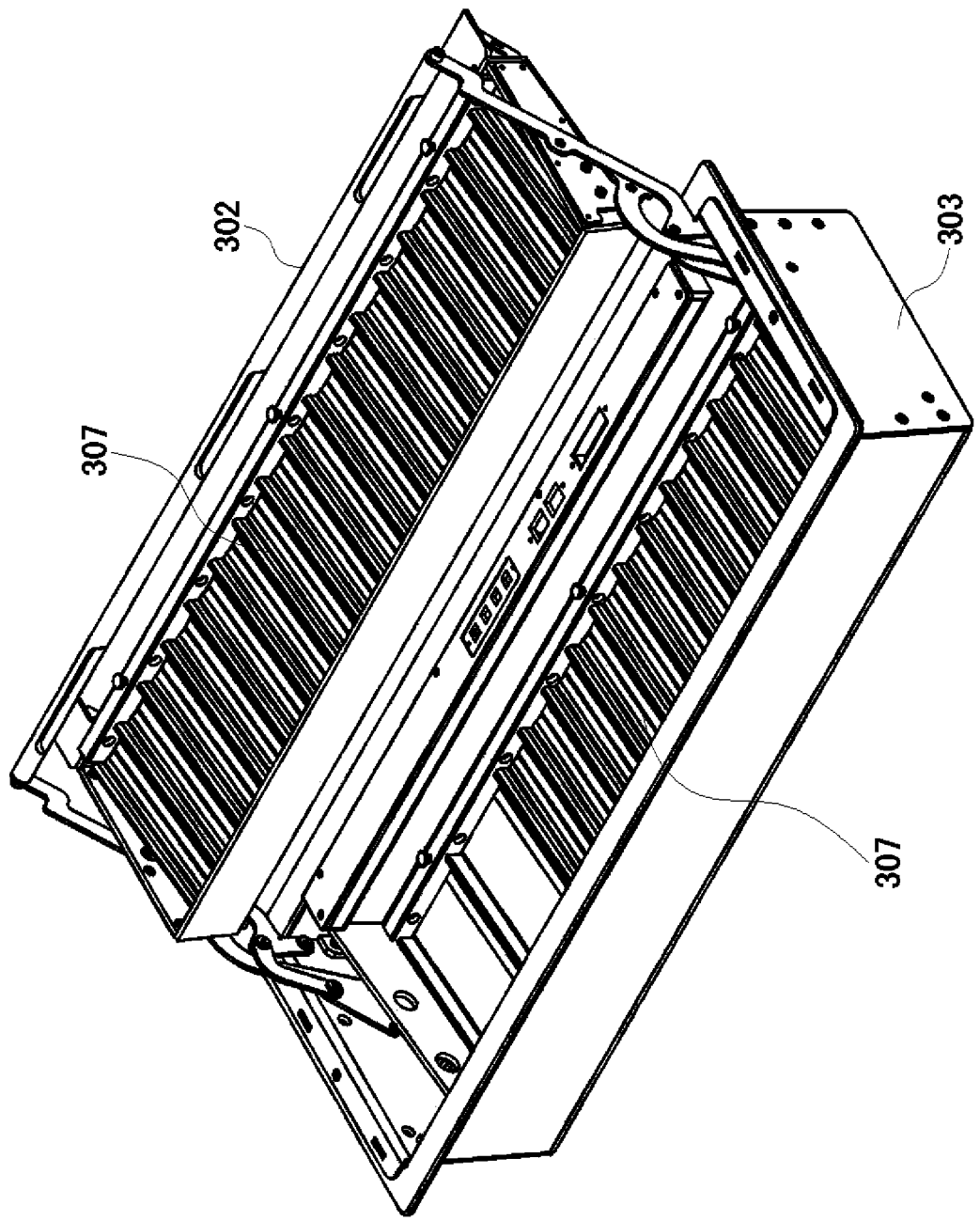
FIG. 11 is an external view of a double chip tray in the fourth embodiment of the present disclosure.

FIG. 11 shows the appearance of the double chip tray used in the reading system 401. The upper storage tray 402 has a movable configuration, and can take two states: the upper storage tray 402 is on top of the lower storage tray 403 and the lower storage tray 403 is closed; and the upper storage tray 402 is in a place other than on top of the lower storage tray 403 and the lower storage tray 403 is open. The reading system 401 may have a sensor, button, or other detector (not shown) for detecting the open/closed state of the lower housing section 403.

The upper storage tray 402 and the lower storage tray 403 may be provided with grooves 407 for holding the game tokens C, or may hold a stack of game tokens C without the grooves 407. The game tokens C may be held in the upper storage tray 402 and the lower storage tray 403 in a state of being in the chip case CC.

The upper reading device 404 reads the RFID tags of the game tokens C held in the upper storage tray 402. The lower reading device 405 reads the RFID tags of the game tokens C held in the lower storage tray 403.

The control unit 406 is connected to the upper reading device 404 and the lower reading device 405, and identifies and manages the IDs of the game tokens C held in the upper storage tray 402 and the lower storage tray 403 based on the results of these readings. In addition, information such as the type, amount, and number of game tokens C held in the upper storage tray 402 and the lower storage tray 403 may be determined based on the identified IDs, and the determined information may be stored.

In the present embodiment, the upper reading device 404 is configured to read the RFID tags of the game tokens C held in the upper storage tray 402 without reading the RFID tags of the game tokens C held in the lower storage tray 403, or the lower reading device 405 is configured to read the RFID tags of the game tokens C held in the upper storage tray 402 without reading the RFID tags of the game tokens C held in the lower storage tray 403.

According to the first embodiment of the present disclosure, the configuration for not reading the game tokens C placed in the other storage tray described above can be made by using a configuration in which the magnetic field generated by each antenna is reduced by using a plurality of antennas, or a configuration in which the magnetic field generated by each wiring portion is reduced by making the wiring portions dense. Alternatively, a shield such as an electrostatic shield or a magnetic shield (not shown) may be provided between the upper storage tray 402 and the lower storage tray 403 using an aluminum plate, ferrite sheet, or the like. Alternatively, the lower storage tray 403 may be configured so that the other storage tray is located outside the reading area of one of the reading device when the lower storage tray 403 is open, and reading is performed with the lower storage tray 403 open so that the game tokens C in the other storage tray are not read. Furthermore, a plurality of these means may be used in combination.

Next, using FIG. 12, the method of distinguishing between the game tokens C placed in the upper storage tray 402 and the game tokens C placed in the lower storage tray 403 in this embodiment will be described.

Figure 12:
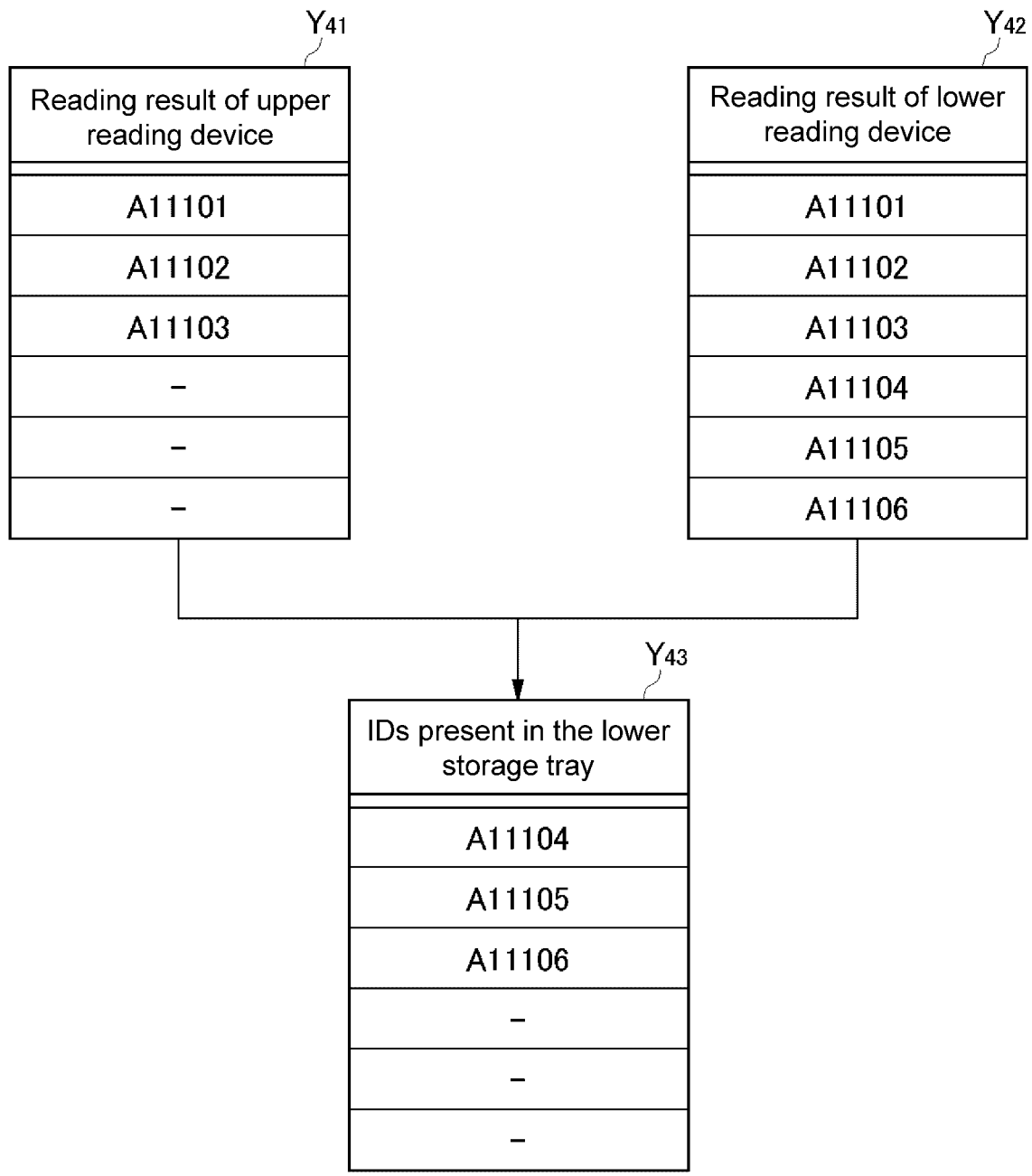
FIG. 12 shows an illustration of a method of identifying IDs in the fourth embodiment of the present disclosure.

FIG. 12 shows a case in which the upper reading device 404 is configured not to read the RFID tag of the game token C placed in the lower stage housing 403. Based on the reading result Y41 of the upper reading device 404, the control unit 406 identifies the ID of the game token C held in the upper storage tray 402, and compares the reading result Y41 of the upper reading device 404 with the reading result Y42 of the lower reading device 404. Since the game token C assigned the ID read by both the upper reading device 404 and the lower reading device 405 is considered to be held in the upper storage section C, the reading result of the upper reading device 404 is subtracted from the reading result of the lower reading device 405 to obtain the result of identifying the IDs of the game tokens C held in the lower storage tray 403. In this way, the identification result Y43 of the IDs of the game tokens C held in the lower storage tray 403 can be obtained.

Similarly, when the lower reading device 405 does not read the RFID tags of the game tokens C held in the upper storage tray 402, the control unit identifies the IDs of the game tokens C stored in the lower storage tray 403 based on the reading result of the lower reading device, and compares the reading result of the upper reading device 404 with that of the lower reading device, and subtracting the latter from the former. In this way, it is possible to obtain the result of identifying the IDs of the game tokens C held in the upper storage tray 402.

Figure 13:
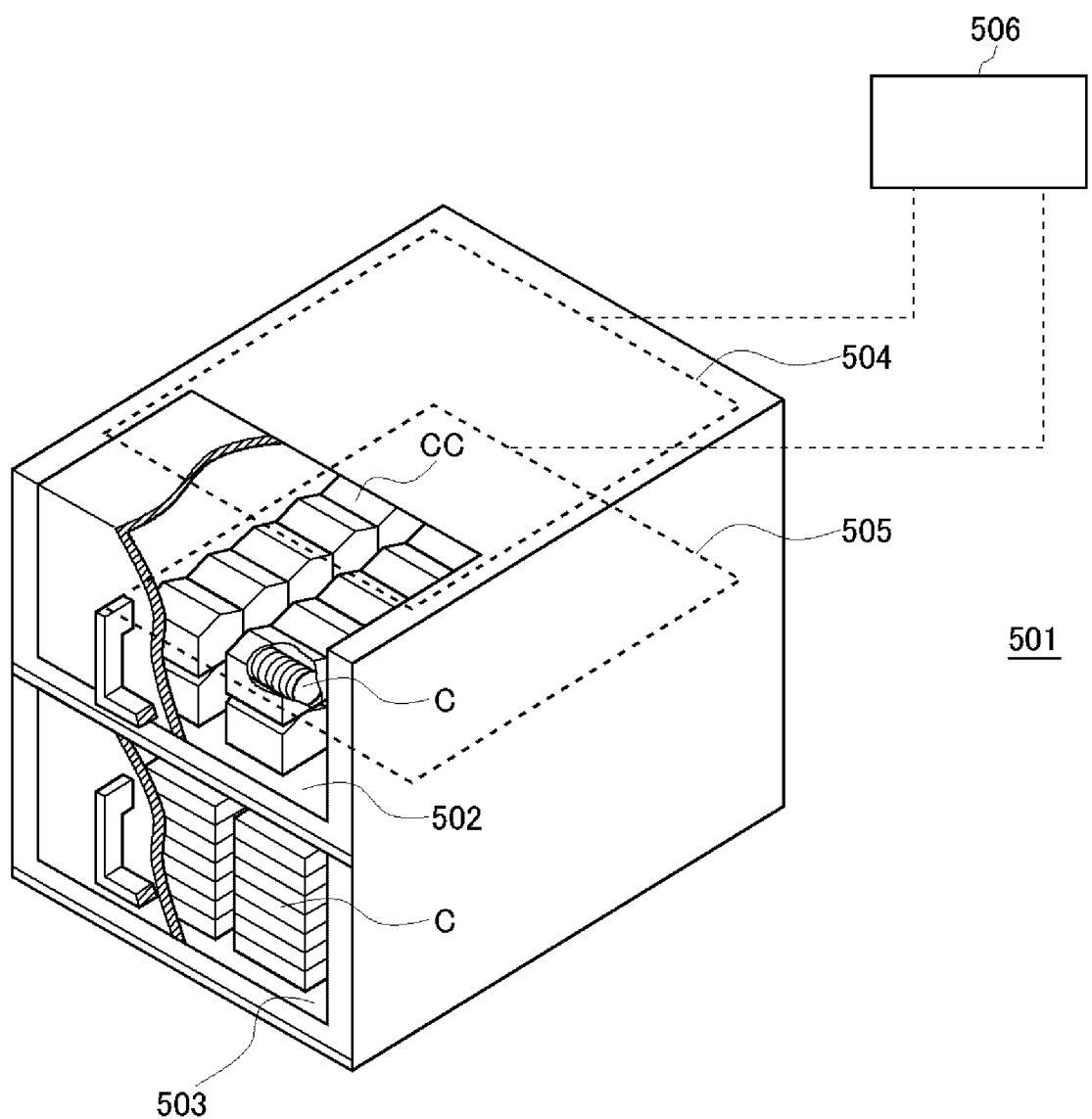
FIG. 13 shows a schematic diagram of a reading system in the fifth embodiment of the present disclosure.

Next, aa reading system of the game token of the fifth embodiment of the present disclosure will be described. FIG. 13 is a schematic diagram of the reading system 501 of the present disclosure. The reading system 501 is used to manage the game tokens C by reading the RFID tags provided in the game tokens C housed in a storage cabinet having a housing section divided into a plurality of tiers in a casino, and distinguishing in which tier of the storage cabinet the game token C is housed.

The reading system 501 has an upper housing section 502 and a lower housing section 503 for housing game tokens C, upper reading device 504 and 505 for reading RFID tags provided in the game tokens C, and a control unit 506 for determining and managing the housed game tokens C based on the reading results of these reading device. In this embodiment, the upper reading device and the lower reading device refer to the antenna for reading the RFID tag and the RFID reader that controls the antenna together.

The reading system 501 has an upper housing section 502 and a lower housing section 503. The upper housing section 502 and the lower housing section 503 can be opened and closed independently of each other. The reading system 501 may further have a sensor, button, or other detector (not shown) for detecting the open/close status of the upper housing section 502 and the lower housing section 503, respectively.

The upper housing section 502 and the lower housing section 503 may be provided with grooves (not shown) for holding the game tokens C, or they may house a stack of game tokens C without grooves. The game tokens C may be housed in the upper housing section 502 and the lower housing section 503 in a state of being housed in a chip case CC.

The reading system 501 has the upper reading device 504 and the lower reading device 505. The upper reading device 304 reads the RFID tags of the game tokens C contained in the upper housing section 502. The lower reading device 505 reads the RFID tags of the game tokens C housed in the lower housing section 503.

The control unit 506 is connected to the upper reading device 504 and the lower reading device 505, and identifies and manages the IDs of the game tokens C housed in the upper housing section 502 and the lower housing section 503 based on the reading results of these reading device. In addition, information such as the type, amount, and number of game tokens C stored in the identified IDs may be determined, and the determined information may be stored.

In this embodiment, the upper reading device 504 is configured to be able to read the RFID tag of the game token C housed in the upper housing section 502 without reading the RFID tags of the game tokens C housed in the lower housing section 503, or the lower reading device 505 is configured to be able to read the RFID tag of the game token C housed in the upper housing section 502 without reading the RFID tags of the game tokens C housed in the upper housing section 502.

According to the first embodiment of the present disclosure, for the configuration for not reading the game token C placed in the other housing section described above, a configuration in which the magnetic field generated by individual antennas is reduced by using a plurality of antennas or a configuration in which the magnetic field generated by individual wiring portions is reduced by making the wiring portions dense may be used. Alternatively, a shield such as an electrostatic shield or a magnetic shield (not shown) may be provided between the upper housing section 502 and the lower housing section 503 using aluminum plates, ferrite sheets, or the like. Alternatively, one of the housing sections may be configured so that the other housing section is positioned outside the reading area of one of the reading device when one of the housing sections is open, and reading is performed with one of the housing sections open so that the game tokens C in the other housing section is not read. In addition, a plurality of these methods may be used in combination.

Next, using FIG. 14, the method of distinguishing between the game tokens C placed in the upper housing section 502 and the game token C placed in the lower housing section 503 will be described.

Figure 14:
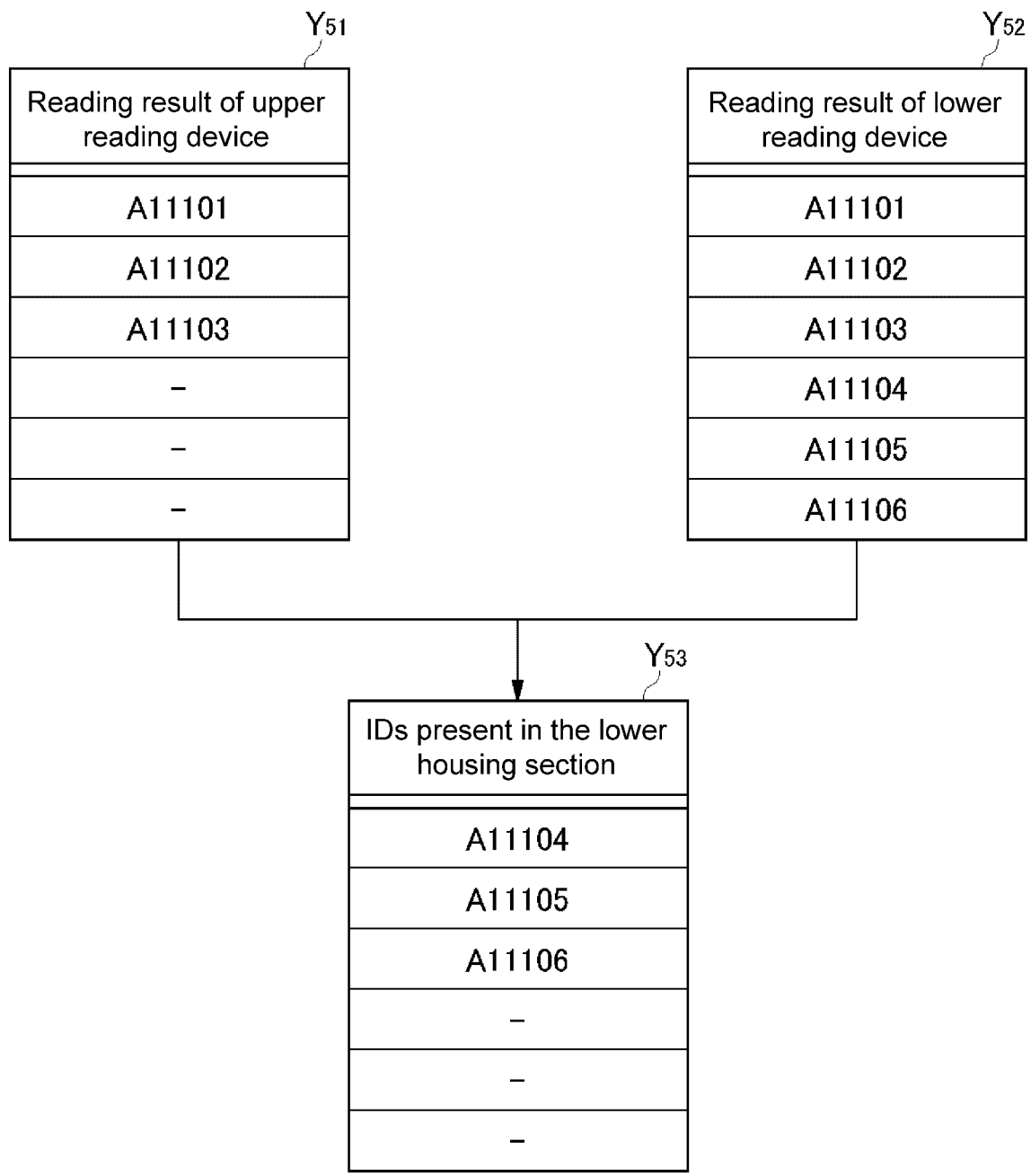
FIG. 14 shows an illustration of a method of identifying IDs in the fifth embodiment of the disclosure.

FIG. 14 shows a case in which the upper reading device 504 is configured not to read the RFID tags of the game tokens C placed in the lower housing section 503. The control unit 506 identifies the IDs of the game tokens C housed in the upper housing section 502 based on the reading result Y51 of the upper reading device 504, and compares the reading result Y51 of the upper reading device 504 with the reading result Y52 of the lower reading device 505. Since the game token C that is assigned the ID read by both the upper reading device 504 and the lower reading device 505 is considered to be housed in the upper housing section C, the result of the reading of the upper reading device 504 is subtracted from the result of the reading of the lower reading device 505 to identify the IDs of the game tokens C housed in the lower housing section 503. In this way, the identification result Y53 of the IDs of the game tokens C housed in the lower housing section 503 can be obtained.

Similarly, when the lower reading device 505 is configured not to read the RFID tags of the game tokens C housed in the upper housing section 502, the control unit identifies the IDs of the game tokens C housed in the lower housing section 503 based on the reading result of the lower reading device, compares the reading result of the upper reading device 504 with that of the lower reading device, and subtracts the latter from the former. In this way, it is possible to identify the ID of the game token C housed in the upper housing section 502.

EXPLANATION OF REFERENCES

101, Reading system
102, Storage tray
103, Groove
104, Antenna
105, RFID reader
107, Control unit
108, Wiring portion extending in predetermined direction
Y11, Reading result of the first antenna
Y12, Reading result of the second antenna
Y13, IDs present in the storage area
201, Reading system
204, Antenna
205, RFID reader
207, Control unit
208a, Wiring portion extending in the direction across the boundary
208b, Wiring portion extending in the direction along the boundary
209, Storage area
212, Camera
213, Winning/losing determination device
Y21, Reading result of the first antenna
Y22, Reading result of the second antenna
Y23, IDs present in the betting area
301, Reading system
302, Storage area
303, Control unit
304, Storage area reading device
305, Betting area reading device
306, Camera
307, Win/loss determination device
401, Reading system
402, Upper storage tray
403, Lower storage tray
404, Upper reading device
405, Lower reading device
406, Control unit
Y41, Reading result of upper reading device
Y42, Reading result of lower reading device
Y43, IDs present in the lower storage tray
501, Reading system
502, Upper housing section
503, Lower housing section
504, Upper reading device
505, Lower reading device
506, Control unit
Y51, Reading result of upper reading device
Y52, Reading result of lower reading device
Y53, IDs present in the lower housing section
B, Betting area
D, Dealer
P, Game participant
C, Game token
T, RFID tag
CC, Chip case

The invention claimed is:

1. A reading system for game tokens, comprising:
 a storage section that is provided in a game table and extending in a plane, for storing a game token equipped with a radio-frequency identification (RFID) tag,
 wherein the RFID tag stores at least an ID assigned to the game token;
 a reading device having a plurality of antennas, each configured to generate an electromagnetic wave for reading the RFID tag of the game token stored in the storage section,
  wherein the plurality of antennas corresponds to a plurality of partial areas of the storage section so that the electromagnetic waves of the plurality of antennas do not read the RFID tag of the game token placed in an area other than the storage section where the game token is stored, and
  wherein the plurality of antennas is arranged to have overlapping portions in respective reading ranges of the antennas such that when the game token is stored in a portion of the storage section corresponding to an overlapping portion, the RFID tag can be read in duplicate by multiple antennas, and;
 a control unit configured to:
  identify the ID assigned to the game token stored in the storage section, and
  determine that there is one game token in the storage section with the ID assigned when the RFID tag on the same game token is read in duplicate by the electromagnetic waves generated by multiple antennas.

2. The reading system for game token according to claim 1, wherein the plurality of antennas has three or more wiring portions extending along a predetermined direction.

3. The reading system for game tokens according to claim 2, wherein the antenna has a dense portion and a sparse portion of wiring portions extending in the predetermined direction,
 the antenna is configured so that a direction of electric current flowing in the wiring portions of each of the dense portions is in the same direction as each other.

4. The reading system for game token according to claim 2, wherein:
 the storage section is located in a vicinity of a betting area where game participants place the game tokens,
 the predetermined direction is a direction from the storage section to the betting area, and
 the wiring portions extending in the predetermined direction are arranged in a striped pattern over an entirety of the storage section.

5. The reading system for game token according to claim 2, wherein:
 the game table has a betting area where a game participant places the game token,
 the predetermined direction is a direction perpendicular to the direction from the storage section to the betting area, and the wiring portions extending in the predetermined direction are arranged in a striped pattern over the entirety of the storage section.

6. The reading system for game token according to claim 5, wherein three or more of the wiring portions extending along the predetermined direction are included in one antenna.

7. The reading system for game token according to claim 1, wherein the plurality of antennas are positioned above or below the storage section.

8. The reading system for game token according to claim 1, wherein the reading device has a group of antennas comprising a plurality of antennas that enable the reading of an RFID tag provided in the game token placed in the same partial area of the plurality of partial areas.

9. The reading system for game token according to claim 1, wherein the reading device has one reader configured to read the RFID tag using all of the plurality of antennas included in one group of the antennas.

10. The reading system for game token according to claim 9, wherein the reader is configured to perform the reading multiple times by changing the antenna used.

11. The reading system for game token according to claim 1, wherein the reading device has one reader configured to read the RFID tag using the plurality of antennas.

12. The reading system for game token according to claim 1, wherein the reading device is configured to perform the reading multiple times by changing the antenna to be used among the plurality of antennas.

13. The reading system for game token according to claim 2, wherein the plurality of antennas are arranged such that the wiring portions overlap each other.

14. The reading system for game token according to claim 1, further comprising:
a collected game token storage section adjacent to the storage section and configured to temporarily store the game token collected from a player,
wherein the collected game token storage section comprises an antenna for the collected game token different from the plurality of antennas provided for the plurality of partial areas of the storage section.

15. The reading system for game token according to claim 14, further comprising a shielding member provided between the storage section and the collected game token storage section, and configured to prevent the plurality of antennas corresponding to the plurality of partial areas of the storage section from reading the RFID tag of the game token in the collected game token storage section and/or prevent the antenna for the collected game token from reading the RFID tag of the game token in the storage section.

16. The reading system for game token according to claim 15, wherein:
the RFID tag stores at least an ID assigned to the game token,
the reading system is configured such that the plurality of antennas provided for the plurality of partial areas of the storage section do not read the RFID tag of the game token in the collected game token storage section,
the reading system further comprises a control unit configured to identify the IDs of the game tokens stored in the storage section and the collected game token storage section, and
the control unit is configured to determine that the game token to which the ID is assigned is present in the storage section when the ID read by the antenna in the storage section overlaps with the ID read by the antenna for collected game token.

17. The reading system for game token according to claim 15, wherein:
the RFID tag stores at least an ID assigned to the game token,
the reading system is configured such that the antenna for collected game token does not read the RFID tag of the game token in the storage area,
the reading system further comprises a control unit configured to identify the IDs of the game token stored in the storage section and the collected game token storage section, and
the control unit is configured to, when the ID read by the antenna in the storage section overlaps with the ID read by the antenna for collected game token, determine that the game token with the ID assigned is present in the collected game token storage section.

* * * * *